(12) United States Patent
Lindblom

(10) Patent No.: US 7,326,009 B2
(45) Date of Patent: Feb. 5, 2008

(54) EDGE-CARRYING DRILL BODY HAVING AN INTERNAL CHIP-REMOVAL CHANNEL

(75) Inventor: Stefan Lindblom, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 12 days.

(21) Appl. No.: 10/849,447

(22) Filed: May 20, 2004

(65) Prior Publication Data

US 2005/0025594 A1 Feb. 3, 2005

(30) Foreign Application Priority Data

May 20, 2003 (SE) .................................. 0301455

(51) Int. Cl.
*B23B 41/02* (2006.01)
(52) U.S. Cl. .................... 408/59; 408/57; 408/227; 408/229; 408/705
(58) Field of Classification Search ................. 408/57, 408/59, 67, 207, 224, 226, 227, 229, 705; B23B 41/02
See application file for complete search history.

(56) References Cited

U.S. PATENT DOCUMENTS

| | | | | |
|---|---|---|---|---|
| 3,010,345 A | * | 11/1961 | Wagner | 408/59 |
| 3,163,246 A | * | 12/1964 | Vagins et al. | 175/420.1 |
| 3,274,863 A | * | 9/1966 | Faber | 408/207 |
| 3,751,177 A | * | 8/1973 | Faber | 408/200 |
| 3,816,018 A | * | 6/1974 | Hlocky | 408/59 |
| 4,225,275 A | * | 9/1980 | Elliott | 408/229 |
| 4,293,252 A | * | 10/1981 | Kress et al. | 408/224 |
| 4,330,044 A | * | 5/1982 | Orr et al. | 175/420.1 |
| 4,527,931 A | * | 7/1985 | Sarin | 407/113 |
| 4,605,079 A | * | 8/1986 | Leibee et al. | 175/420.1 |
| 5,152,642 A | * | 10/1992 | Pitts et al. | 408/226 |
| 5,791,838 A | * | 8/1998 | Hamilton | 408/224 |
| 5,820,318 A | * | 10/1998 | Danielsson et al. | 408/191 |
| 5,860,773 A | * | 1/1999 | Blomberg et al. | 408/83 |
| 5,964,553 A | * | 10/1999 | Blomberg et al. | 408/224 |
| 6,019,553 A | * | 2/2000 | Yakamavich, Jr. | 408/224 |
| 6,065,908 A | * | 5/2000 | Kleine et al. | 408/67 |
| 6,540,449 B1 | | 4/2003 | Bejerstål et al. | |
| 6,595,305 B1 | * | 7/2003 | Dunn et al. | 175/420.1 |
| 6,602,028 B1 | * | 8/2003 | Lindblom et al. | 408/83 |
| 6,637,521 B2 | * | 10/2003 | Saitta | 175/19 |
| 6,682,275 B1 | * | 1/2004 | Lindblom et al. | 408/59 |

(Continued)

FOREIGN PATENT DOCUMENTS

| | | |
|---|---|---|
| EP | 1 224 994 | 7/2002 |
| RU | 2 156 180 | 9/2000 |
| SU | 729006 | 4/1980 |
| SU | 1773584 | 11/1992 |

(Continued)

*Primary Examiner*—Monica Carter
*Assistant Examiner*—Sara Addisu
(74) *Attorney, Agent, or Firm*—Drinker Biddle & Reath LLP

(57) ABSTRACT

An edge-carrying drill body intended for deep hole drilling, is rotatable around a central geometric axis and comprises a through-channel arranged for internal chip evacuation. The channel mouths in front and rear ends of the drill body. A front channel mouth is bridged-over by a bridge on which a plurality of cutting edges are formed, which edges are made integrally with the rest of the bridge. The front mouth includes inlets disposed in front of respective cutting edges with reference to the direction of rotation of the body.

13 Claims, 3 Drawing Sheets

U.S. PATENT DOCUMENTS

| | | |
|---|---|---|
| 6,860,344 B2 * | 3/2005 | Bise et al. .................. 175/430 |
| 6,915,867 B2 * | 7/2005 | Bise ........................ 175/420.1 |
| 6,948,890 B2 * | 9/2005 | Svensson et al. ............. 408/59 |
| 2003/0091402 A1 | 5/2003 | Lindblom |
| 2003/0103824 A1 | 6/2003 | Hansson et al. |
| 2004/0265080 A1 * | 12/2004 | Danielsson et al. ........... 408/57 |

FOREIGN PATENT DOCUMENTS

| | | |
|---|---|---|
| WO | 00/78489 | 12/2000 |
| WO | 01/30524 | 5/2001 |
| WO | 03/031104 | 4/2003 |

* cited by examiner

EDGE-CARRYING DRILL BODY HAVING AN INTERNAL CHIP-REMOVAL CHANNEL

This application claims priority under 35 U.S.C. §§119 and/or 365 to patent application Ser. No. 0301455-2 filed in Sweden on May 20, 2003, the entire content of which is hereby incorporated by reference.

BACKGROUND OF THE INVENTION

This invention relates to an edge-carrying drill body, which is rotatable around a central geometric axis and comprises a through channel that is arranged for internal chip evacuation and that mouths in front and rear ends of the body.

DESCRIPTION OF THE PRIOR ART

Within the field of chip forming machining, deep hole drilling constitutes an area difficult to master, in particular when the holes should be extraordinary long or deep. By long holes, holes having a relatively great ratio of hole depth to hole diameter (D) are intended, e.g., hole depths of from 5×D up to 100×D or more. For the machining in question, drilling tools of two different main categories are used, viz, so-called ejector drills and STS drills (Single Tube System), respectively, the last-mentioned one of which includes a front drill body and at least one rearwardly extending tube to which the drill body is detachably connected. In the last-mentioned case, supply of the cutting (flush) fluid requisite for lubrication and cooling takes place along the outside of the tube, while the chip evacuation as well as the evacuation of the cutting fluid takes place internally via a through channel in the drill body and the interior of the tube. The drilling is usually carried out in special deep hole drilling machines that are constructed for optional operation methods, e.g., rotary workpiece, rotary tool or a combination of both rotary workpiece and rotary tool. However, most common is that the workpiece rotates, while the tool solely performs the linear feed motion. Furthermore, it should be pointed out that drilling by means of STS drills may be carried out either by full drilling (when the hole of predetermined diameter is drilled in a solid material in one single operation) or such as boring (compare also reaming and broaching).

Generally, the drill bodies of deep hole drills are made from a basic body of steel or the like, as well as one or more cutting inserts of cemented carbide or CERMET, the cutting inserts being flat and including the cutting edge(s) that is(are) required for the chip removal. In coarser drills, viz. for hole diameters greater than 25 mm, the cutting inserts may be fastened on the basic body either by being soldered onto the same, or be detachably connected to the basic body, e.g., by means of screws. In the last-mentioned case, the cutting inserts usually consist of indexable inserts. However, at small diameters (9-25 mm), only soldered cutting inserts are possible because the requisite means for clamping detachable cutting inserts would complicate and weaken the comparatively weak steel body too much.

In both cases, however, not only the drill bodies as such, but also the manufacture of the same, are associated with a plurality of disadvantages. One disadvantage is that the drill bodies have to be made with asymmetrical tool geometry where the drill tip is displaced or eccentric in relation to the geometrical center axis of the drill body. In order to carry the radial cutting forces, the drill body has to be provided with external support strips, which have the purpose of supporting the drill body during the drilling operation. The existence of said support strips may give rise, on one hand, to pressing-in of chips and particles in the machined hole surface, and on the other hand, to high pressure and high generation of heat as a consequence of the friction against the surrounding hole wall, which heat produces cracks in the cutting inserts and strong wear of the same. Furthermore, the strips intrude on the width of the chip inlet(s); something that in turn increases the risk of chip stopping and inferior chip breaking.

Another disadvantage of the previously known drilling tools is that the same may be totally destroyed if the drill body becomes stuck in a workpiece, more precisely not only the front drill body but also the rear tube are demolished upon jamming.

It should also be pointed out that the precision of the drill bodies during machining may become mediocre, in particular after one or more exchanges of cutting inserts. What is more, the production cost for the drill bodies is high as well as the cost for possible regrinding.

From, for instance, PCT/SE 00/02073 (corresponding to WO 01/30524 and to U.S. Pat. No. 6,540,449), PCT/SE 02/01814 (corresponding to WO 03/031104), PCT/SE 02/01916 (corresponding to Publication US-2003/0091402-A1, now U.S Pat. 6,783,307) and PCT/SE 02/02060 (corresponding to Publication US-2003/0103824A1, now U.S. Pat. 6,899,495), it is previously known to manufacture detachable machining bodies, so-called loose tops, which are made with one or more edges integrally with a basic body of cemented carbide and fastenable on a front end of a long narrow shaft. However, in that case, the machining body as well as the shaft lack every form of internal chip channel through which chips and cooling liquid could be evacuated internally in the way contemplated by the present invention. Moreover, not even an edge-carrying front bridge is included in such prior art that could bridge over such a channel.

OBJECTS AND FEATURES OF THE INVENTION

The present invention aims at obviating the above-mentioned disadvantages of previously known drill bodies for deep hole drilling and at providing an improved drill body. Therefore, it is a primary object of the invention to provide an edge-carrying drill body having a symmetrical geometry, which becomes self-centering and which, therefore, may be manufactured without any problematic support strips.

An additional object is to provide a drill body having a chip evacuation channel, the chip inlets of which can be constructed with optimum width with the purpose of improving the chip breaking and counteracting the risk of chip stopping.

Yet another object of the invention is to provide a drill body that reduces the risk of total damage if the drill body were to become stuck in a work-piece.

It is also an object to provide a drill body that guarantees a good machining precision and that has a long service life.

An additional object of the invention is to provide a drill body, which during chip removal, generates chips of a reduced width in order to facilitate the chip evacuation.

According to the invention, at least the primary object is attained by an edge-carrying drill body rotatable about a central geometric axis. The body comprises a through channel arranged for internal chip evacuation and mouthing (opening) in the front and rear ends of the body to form front and rear mouths, respectively. The front mouth is bridged-over by a bridge on which a plurality of cutting edges are disposed, the cutting edges being integral with the rest of the bridge. The front mouth forms a plurality of chip inlets disposed in front of respective cutting edges, wherein "front" is considered with reference to the direction of rotation of the body.

The invention is based on the idea of manufacturing such drill bodies intended for deep hole drilling that have an internal through-channel for chip and cooling liquid removal, the body having a front brigde on which a plurality of integal edges are included, and in front of which—seen in the direction of rotation of the drill body—there are chip inlets to the channel. In practice, said bridge is advantageously made from cemented carbide or CERMET, wherein the bridge either may be included as an intergrated part of the body in its entirety, or be made as a unit that in suitable way is fixed on a rear unit of any material, e.g., steel. Due to the fact that the cutting edges are intergrated in the bridge, in a simple way the drill body can be formed with a symmetrical cutting geometry, which way the drill body self-centering. In other words, any need for support strips on the outside of the drill body is eliminated.

BRIEF DESCRIPTION OF THE DRAWINGS

The objects and advantages of the invention will become apparent from the following detailed description of preferred embodiments thereof in connection with the accompanying drawings, and in which like numerals designate like elements.

DESCRIPTION OF PREFERRED EMBODIMENTS

Figure 1:
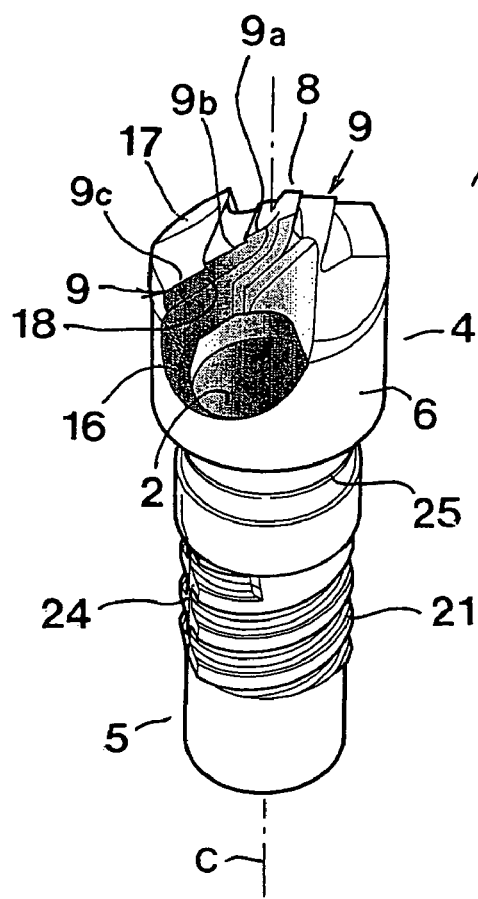
FIG. 1 is a perspective view of a drill body having two cutting edges made according to a first embodiment of the invention.
Figure 2:
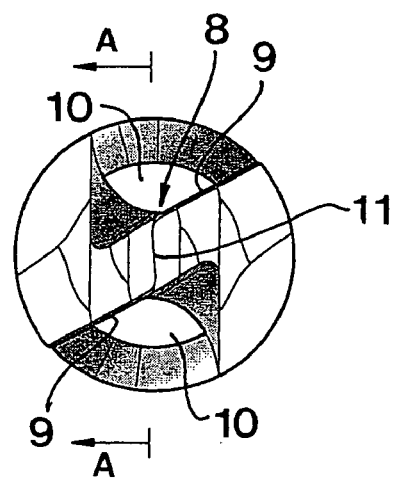
FIG. 2 is a front view of the drill body according to FIG. 1, Image Page 2

In FIGS. 1-2, there is shown a first embodiment of an edge-carrying drill body 1, which is rotatable around a central geometric axis C and comprises a through-channel 2 arranged for internal chip evacuation. Said channel mouths (opens) in front and rear ends of the body 1 to form front and rear mouths, respectively.

Figure 3:
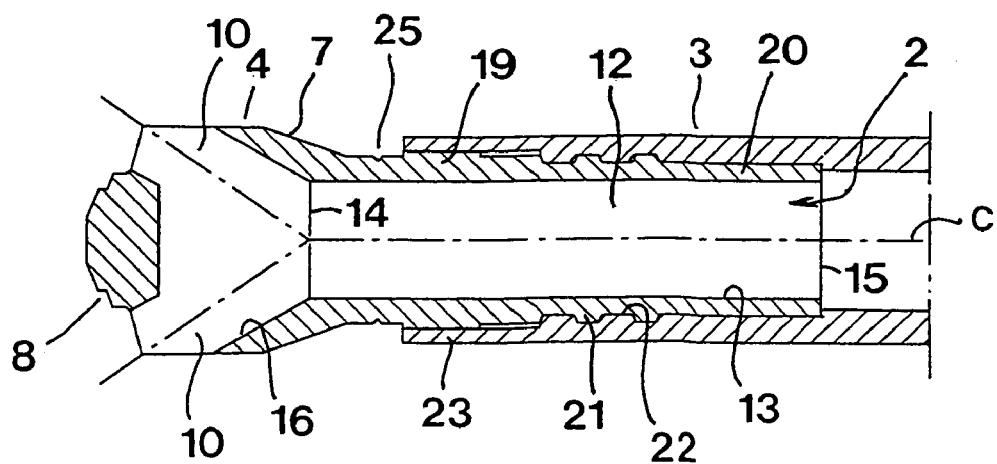
FIG. 3 is a longitudinal section A-A through the drill body of FIG. 2 which is mounted in a tube that, together with the drill body, forms an operative drilling tool.

The drill body 1 is connectable with a cylindrical tube 3 shown in FIG. 3, together with which tube the same forms an operative drilling tool of the type that, to those skilled in the art, is denominated STS drill (Single Tube System). Drills of this type are intended for deep hole drilling and are included in an extensive drilling equipment (or machine), which in the area of the rear end (not shown) of the tube 3 includes sealing devices via which cooling liquid can be introduced under pressure in the ring-shaped gap that is formed between the outside of the tube and a hole recessed by the drill body 1 in a workpiece. For this purpose, the tube 3 has an outer diameter that is smaller than the diameter of the hole. Evacuation of the cooling liquid as well as the chips released by the drill body is carried out internally via the channel 2.

Figure 6:
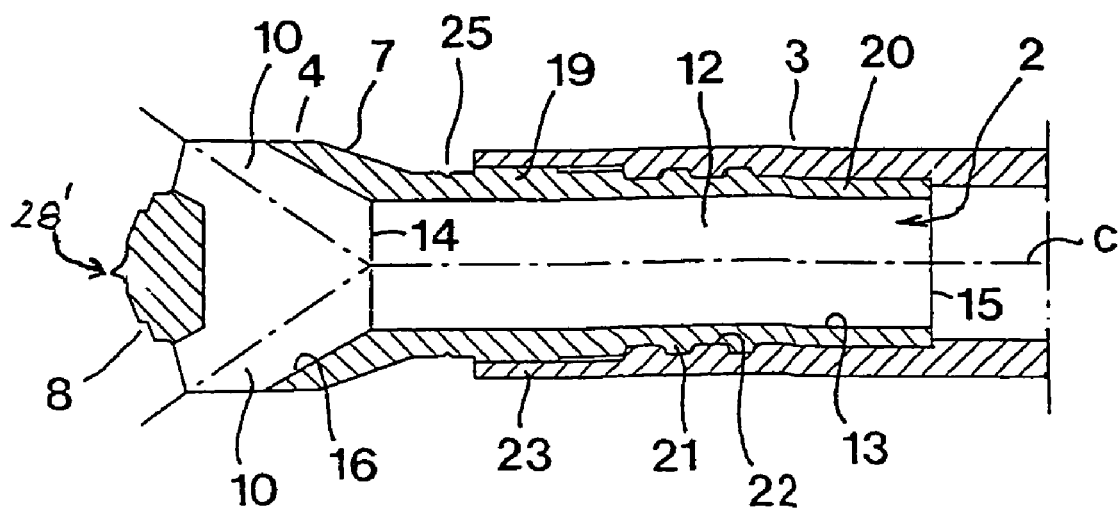
FIG. 6 is a view similar to FIG. 3 of a modified drill body having a center punch.

The drill body 1 comprises a front head 4, as well as a thinner, hollow shaft or sleeve 5. The head 4 has a cylindrical or rotationally symmetrical basic shape such that the same has a cylindrical or slightly conical envelope surface 6. Via a marked conical surface 7, the envelope surface 6 transforms into the shaft 5 which, in turn, has a cylindrical or rotationally symmetrical basic shape. In accordance with the invention, the drill body is, at the front end thereof, formed with a bridge 8, which bridges-over the front opening or mouth of the through channel 2. In this case, on said bridge, two culling edges 9 are integrally formed. As is seen in FIGS. 2 and 3, two chip inlets 10 are defined on opposite sides of the bridge 8, which inlets are located in the area circumferentially in front of the appurtenant cutting edges 9, ("front" being considered with reference to the direction of rotation of the drill). The two cutting edges 9 are generally diametrically opposed to each other and mutually parallel, although displaced from the geometrical center axis C of the drill body. In this connection, the inner ends of the edges are inter-connected via an inclined chisel edge 11, which in a conventional way may be formed with a center punch 28' (FIG. 6) which forms a centering tip in connection with the entering of a workpiece by the drill. The drill body has a generally symmetrical culling geometry, more precisely such that the two cutting edges are equidistantly spaced-apart (180°) in the tangential direction. This symmetrical geometry means that the cutting forces on the two edges balance out each other so that the drill becomes self-centering. For this reason, the head of the drill body may be formed with an envelope surface 6, which is rotationally symmetrical and smooth such that the same lacks externally protruding support strips.

The through chip channel, in its entirety designated 2, includes three different sections or bores, one 12 of which is cylindrical and concentrical with the center axis C, while the two other sections consist of the two chip inlets 10. More precisely, the internal cylinder surface 13, which defines the bore 12, is entirely smooth from the front end 14 thereof to the rear opening 15. The front bores 10 extend separately in general at an obtuse angle to the bore 12. The interior surface 16 that defines the individual chip inlet 10 has a partially conical shape, more precisely in such a way that the inlet widens in the forward direction or axially outwards. Thus, the inlet is substantially funnel-like.

The front surface 17 of the bridge 8 has a generally conical shape in that the surface in question converges from the outer periphery in the direction of the center C of the drill body. Each individual cutting edge 9 is formed in the transition between a planar surface 18 and the front surface 17, the surface 18 forming a cuffing surface (chip surface) and the surface 17 a clearance surface. Although the cutting edge 9 could consist of an edge that is entirely straight from the center to the periphery, in the embodiment shown, it has been preferred to form the edge in steps. More precisely, the cutting edge is stair-like and formed with three different part edges 9a, 9b, 9c, the radially innermost (9a) of which is displaced axially forwards in relation to the next (9b), etc. The elevational difference between said part edges may be within the range of 0.05-0.3 mm. Due to the fact that the cuffing edge in this way is composed of a plurality of different part edges, displaced axially in relation to each other, a plurality of different chips, each of which being thinner than the total length of the cutting edge, will be formed during the drilling. In this way, chip breaking as well as chip evacuation is, to a large extent, facilitated.

The tubular piece of material that forms the shaft 5 includes a relatively thick, front wall section 19, as well as a thinner, rear wall section 20.

In order to detachably connect the drill body 1 with the tube 3, these components are formed with connection means. In the example, said connection means consist of threads. More precisely, a male thread 21 is formed on the shaft 5 of the drill body, while a female thread 22 is formed on the inside of the tube 3. In this connection, it should be pointed out that the front wall section 23 of the tube 3 is somewhat thinner than the rest of the tube wall. The male thread 21 is interrupted along circumferentially spaced areas on the shaft, while providing planar, thread-free surfaces or formations 24. More precisely, said thread-free formations are located on diametrically opposed sides of the shaft, whereby each thread section is substantially semicircular and delimited at opposite ends by wedge-shaped, substantially planar surfaces (see FIG. 1). The female thread 22 is, however, continuous. In this connection, it should be pointed out that the tube 3 is made from steel or the like, which can be machined by turning. Thus, the female thread 22 may be provided by conventional chasing of threads.

By forming flattened surfaces 24 in the above described way on opposite sides of the shaft, the form stripping of an initially formed green ware of the type that will be described below is facilitated.

In the drill body 1, a fracture line, or breakage weakening, is included, which in the example is in the form of a circumferential groove 25 in the envelope surface of the shaft 5. This groove is advantageously circular and located in a plane that extends perpendicularly to the center axis C. The groove is located between the transition surface 7 of the head 4 and the male thread 21 on the shaft. More precisely, the groove is located comparatively near the transition surface 7, whereby the same will be located in front of the front end of the tube 3 when the drill body is applied in the tube. By the existence of said breakage weakening, the drill body may be divided into two parts if the head were to become stuck in a workpiece. The tube 3 together with the separated, rear part of the drill body can, on that occasion, proceed to rotate without being demolished. If the groove 25 extends perpendicularly to the center axis C, rotation of the tube (which at the rear end thereof is clamped in the drive mechanism of the drilling equipment) can be effected without axial forces being applied to the tube via the site of fracture. In this connection, it should, however, be pointed out that the groove or the breakage weakening also may be formed in such a way that rotation of the drill tube is stopped. Thus, the groove may be inclined in relation to the center axis or be made curved or arched in order to, upon jamming of the drill body, apply an axial impulsive force to the drill tube, which stops the drive mechanism of the drilling equipment. Manufacture of the Drill Body According to the Invention Series manufacturing of the described drill body may be effected in a molding tool (not shown, but described in Publication U.S.-2004/0265080, corresponding to SE-0301456-00) especially constructed for the purpose, in which a number of cooperating mould parts are included, which together define a tool cavity, the general shape of which corresponds to the external shape of the drill body to be. Two movable mould parts may be separated from each other as well as from a third fixed mould part, so as to enable form stripping of a body formed in the cavity. In the tool cavity, three core pullers or male plugs may be inserted, which at free ends are formed so that they can be interconnected in a common connection point. One of the male plugs is cylindrical and has the purpose of forming a vacant space in the cavity with the aim of providing the bore 12 in the completed drill body 1. In the area of the free ends thereof, the two other male plugs are partially conical in order to form the chip inlets 10 in the drill body to be. Via an inlet to the tool cavity, a moldable compound can be injected from a store in the injection-mould machine.

The compound that is injected in the tool cavity contains a mixture of hard particles, forming cutting material, as well as a degradable adhesive. The adhesive may in practice comprise a combination of different plastics and waxes, which can be stripped away by extraction followed by thermal evaporation or solely thermal evaporation. The expression "cutting material" as used in the present description and the subsequent claims should primarily be regarded to include cemented carbide and CERMET. Conventional cemented carbide is a powder metallurgical material, which essentially is built up by a number of carbides in at least one binder metal. The carbides that are of use are all very hard and may comprise primarily tungsten carbide (WC), but also titanium carbide (TiC), tantalum carbide (TaC) and/or niobium carbide (NbC), while the binder metal usually comprise cobalt (Co) or cobalt alloys. CERMET is, in turn, a common denomination of powder metallurgical materials in which the hard particles comprise titanium carbide (TiC), titanium carbon nitride (TiCN) and/or titanium nitride (TiN). Characteristic of CERMET is that ceramic particles are also included in the binder metal, which for instance may comprise cobalt or nickel-cobalt.

The manufacture is carried out in the following way:

a) In a first step, the molding tool in question is closed by the movable mould parts being interengaged in order to jointly define the tool cavity. In addition, the three male plugs are inserted into the cavity and are inter-connected. In this state, the internal surfaces of the mould parts will determine the external shape of the body being formed, while the internal shape of the bores 12, 10 is determined by the male plugs.

b) In the next step, the compound is injected in the cavity via an inlet. When the cavity has been filled with compound, a certain holding pressure is maintained during a suitable time in order to guarantee that the compound is stabilized and absolutely completely fills out the entire cavity. In this connection, a greenware is formed, the shape of which corresponds to the shape of the cavity and the male plugs.

c) In a third step, the formed greenware is form-stripped when the mould parts are distanced from the greenware, and the male plugs are removed from the same. Hereupon, one of the male plugs leaves a cylindrical hollow space that is to form the bore 12 at the same time as the two other male plugs leave conical hollow spaces that are to form the chip inlets 10.

d) When the greenware has been released, the adhesive (the plastic) is stripped away from the body. This takes place by extraction followed by thermal evaporation or solely by thermal evaporation. When the adhesive has been stripped away, only the particles that are to form the final cutting material remain in the greenware.

e) In a final step, the greenware treated in this way is sintered by heating to at least 1300° C. while obtaining a hardened drill body having the final shape and dimension. In connection with the sintering, the greenware shrinks linearly by 17 to 20% of the original dimensions thereof such as these are determined by the tool cavity.

Above, it has been described how a single homogeneous compound is injected in the molding tool. The described manufacturing method creates, however, also possibilities for making the drill body from two or more material compounds having different properties. For instance, those material sections in which the cutting edge and the envelope surface of the head, respectively, are included, could be made from a material having greater hardness and resistance to wear than the material in other sections in the body. In practice, such multi-stage injection molding may be affected by one or more additional male plugs in addition to the three above-described being inserted into the tool cavity and being drawn out one by one when a first basic body has been formed in the cavity. These supplementing male plugs then leave hollow spaces which, in one or more later steps may be filled with powder compounds that give material having other properties than the material in the basic body. In this case, naturally one or more additional injection inlets are also required together with the appurtenant storage chambers for different powder compounds.

DESCRIPTION OF ADDITIONAL EMBODIMENT OF THE DRILL BODY

Figure 4:
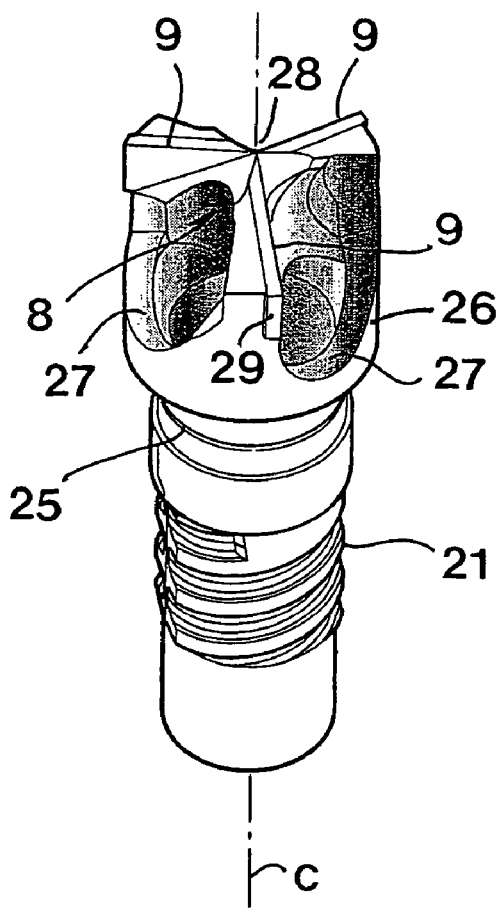
FIG. 4 is a perspective view of an alternative embodiment having three cutting edges.
Figure 5:
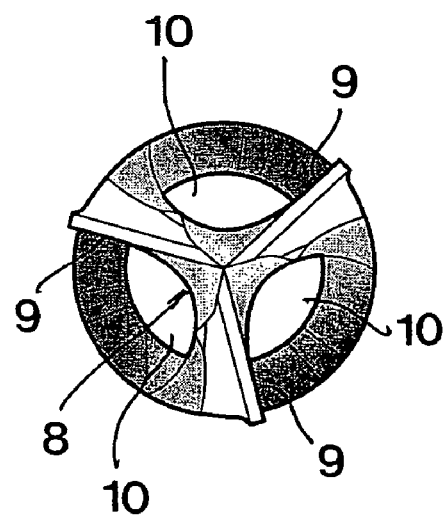
FIG. 5 is a front view of the drill body according to FIG. 4.

In FIGS. 4 and 5, a second embodiment is illustrated, according to which a bridge 8 bridging-over the chip channel opening is formed with three integrated cutting edges 9. Thus, in this case, the bridge includes three bars or bar-like material portions, which emanate from a central intermediate portion of a ring-shaped wall 26 in which three countersinks are formed, which form chip inlets 10 to the internal, through chip channel. The surface 27 defining each individual chip inlet 10 (see also the surface 16 in FIG. 1) is at least partially cone-shaped in order to facilitate the transportation of the chips into and through the inlet. The three bars together with the appurtenant edges are mutually equidistantly spaced-apart in the tangential direction, i.e., the separation between the same is 120°. The edges converge in a common point that forms a centering tip 28 located along the geometrical center axis C of the drill body. In the extension of the three edges, guides 29 are formed with the purpose of abutting against the hole wall.

In the example according to FIGS. 4 and 5, straight cutting edges 9 are shown. These could, however—like the cutting edges according to FIGS. 1-3—also be stepped, i.e., composed of part edges mutually displaced level-wise for the generation of part chips of a reduced width.

Advantages of the Invention

Within the range of deep hole drilling, the invention opens entirely new possibilities of efficient, cost efficient recession of deep holes in connection with full drilling as well as in connection with boring (and reaming and broaching, respectively). In particular, the invention enables the drilling of long holes having a limited diameter, e.g., diameters less than 15 mm while guaranteeing an extremely good precision. One reason for this is that the drill body can be produced in one single piece without the need of time-consuming and precision-deteriorating complementary mounting of separate cutting inserts (irrespective of these being soldered or consisting of clamped indexable inserts). Another substantial advantage is that the invention makes it possible to manufacture self-centering drill bodies for deep hole drilling. This has previously not been possible in such drill bodies that make use of soldered cutting inserts or indexable inserts. A particular advantage in connection with self-centering drill bodies of the type that do not require support strips on the outside thereof, is that the chip inlets may be formed with increased width, resulting in improved transportation of chips and reduced risk of chip stopping. Furthermore, due to the existence of the particular breakage weakening (which can be made by the simple measure of giving the mould parts a suitable design), the advantage is gained that the risk of total damage of the entire drill tool is reduced to a minimum.

Feasible Modifications of the Invention

The invention is not solely limited to the embodiments described above and shown in the drawings. Thus, instead of a threaded joint, other types of connection means may be used, e.g., bayonet couplings, in order to detachably connect the drill body with the tube of the drill. It is also possible to connect the drill body with the tube in another way, e.g., by soldering or the like. In this connection, it should also be pointed out that the drill tube may be composed of a plurality of tube sections in extension of each other. Furthermore, it should be pointed out that the cutting geometry of the drill body such as this primarily is determined by the shape and location of the cutting edges on the head of the drill body may vary most considerably within the scope of the subsequent claims. The drawings that have been used in order to illustrate the general idea according to the invention do not, accordingly, relate to any finished products and should only be regarded as principle drawings (which are influenced by preliminary prototypes of the final products). It should also be mentioned that the described breakage weakening may be realized in another way than in the form of a continuous groove in the envelope surface of the shaft. It should be pointed out that the drill body also may be made from other cutting materials than the ones mentioned above, e.g., ceramics. In conclusion, it should also be mentioned that the bridge made from cemented carbide or the like that carries the edges could be manufactured as a separate unit having a limited volume, the bridge being connectable with a rear drill body member that is manufactured from another material, e.g., steel. The edge-carrying bridge could, for instance, form the coarse, front head of the drill, while the rear part consists of the shaft. In this connection, it is feasible to provide the breakage weakening in the interface between the bridge and the rear part of the drill body. Concerning the step-like formed cutting edges, it should be pointed out that the same not necessarily need to be stair-shaped. Thus, it is feasible to, for instance, countersink (or raise) the midmost of three part edges. That is, the different part edges would be located on different levels in order to generate chips the width of which is smaller than the total width of the cutting edge.

Although the present invention has been described in connection with preferred embodiments, it will be appreciated by those skilled in the art that additions, modifications, substitutions and deletions not specifically described may be made without departing from the spirit and scope of the invention as defined in the appended claims.

What is claimed is:

1. A drill body for chip-removing metal machining defining a center axis of rotation, the drill body comprising:

a front head and a rearwardly extending hollow shaft adapted for connection with a tube, the front head being configured symmetrically about the center axis of rotation and including a bridge defining a plurality of chip inlet openings in the front head, the bridge including a first material;

an axial through-channel adapted to internally evacuate metal chips, the axial through-channel extending between the plurality of chip inlet openings in the front head and an outlet opening at a rear end of the hollow shaft; and a plurality of cutting edges being located behind the inlet openings respectively with reference to a direction of rotation of the drill body, each cutting edge including a second material integrally sintered with the first material of the bridge, and the pluralities of cutting edges and chip inlet openings being configured symmetrically with respect to a tip disposed along the center axis of rotation, each cutting edge extending between the tip and a periphery of the front head and including:

a chip surface facing a respective chip inlet opening; and a clearance surface extending rearwardly from the chip surface with reference to the direction of rotation of the drill body.

2. Drill body according to claim 1, wherein the bridge comprises three of the cutting edges separated by 120° and converging into the tip.

3. Drill body according to claim 1, wherein the bridge comprises two cutting edges that are parallel to each other and displaced from the center axis of rotation, and inner ends of the two cutting edges being interconnected by an inclined chisel edge having a punch, defining the tip.

4. Drill body according to claim 1, wherein the head comprises an envelope surface defining the periphery of the front head, the envelope surface being generally rotationally symmetrical with respect to the center axis of rotation and smooth, and excluding protruding support strips.

5. Drill body according to claim 1, wherein each cutting edge comprises a plurality of step-like displaced part edges adapted to generate part chips, each part edge being shorter than a total length of the cutting edge.

6. Drill body according to claim 1, wherein the bridge is integrally sintered with the front head.

7. Drill body according to claim 1, wherein the front head includes a male thread which is interrupted along circumferentially spaced areas of the shaft to form substantially planar, thread-free formations.

8. Drill body according to claim 1, wherein the first and second materials comprise a single homogenous material.

9. Drill body according to claim 1, wherein the first material is different from the second material.

10. Drill body according to claim 9, wherein the second material comprises greater hardness and resistance to wear.

11. A drill body defining a central geometric axis of rotation and comprising a through-channel arranged for internal chip evacuation and mouthing in front and rear ends of the drill body to form front and rear mouths, respectively, the front mouth bridged over by a bridge on which a plurality of cutting edges are disposed, the cutting edges being integral with the rest of the bridge, the front mouth forming a plurality of chip inlets disposed in front of respective cutting edges with reference to a direction of rotation of the body, wherein the bridge comprises two cutting edges that are parallel to each other and displaced from a geometrical center axis of the drill body, inner ends of the cutting edges being interconnected by an inclined chisel edge having a punch, which forms a centering tip, and each cutting edge being integrally sintered with the bridge.

12. A drill body defining a central geometric axis of rotation and comprising a through-channel arranged for internal chip evacuation and mouthing in front and rear ends of the drill body to form front and rear mouths, respectively, the front mouth bridged over by a bridge on which a plurality of cutting edges are disposed, the cutting edges being integrally sintered with the rest of the bridge, the front mouth forming a plurality of chip inlets disposed in front of respective cutting edges with reference to a direction of rotation of the body, wherein each individual cutting edge is formed with a plurality of Step-like displaced part edges for generating part chips, each part edge being shorter than a total length of the edge.

13. A machining drill body defining a central geometric axis of rotation, comprising:

a through-channel arranged for internal chip evacuation;

front and rear mouths formed in front and rear ends of the drill body, respectively;

a bridge over the front mouth;

a bayonet coupling formed at the rear end of the drill body; and a plurality of cutting edges disposed on the bridge and being integrally sintered with the bridge and extending to the central axis;

the front mouth forming respective chip inlets disposed in front of respective cutting edges with reference to a direction of rotation of the body, the cutting edges and the respective chip inlets being configured symmetrically with respect to the central axis.

* * * * *